United States Patent [19]

Brandenstein et al.

[11] Patent Number: 4,643,700
[45] Date of Patent: Feb. 17, 1987

[54] TENSION ROLLER

[75] Inventors: Manfred Brandenstein, Eussenheim; Ludwig Edelmann, Sulzthal; Roland Haas, Hofheim; Gerhard Herrmann, Schweinfurt; Rudiger Hans, Niederwerrn, all of Fed. Rep. of Germany

[73] Assignee: SKF GmbH, Schweinfurt, Fed. Rep. of Germany

[21] Appl. No.: 730,377

[22] Filed: May 3, 1985

[30] Foreign Application Priority Data

May 5, 1984 [DE] Fed. Rep. of Germany ....... 3416686

[51] Int. Cl.⁴ .............................................. F16H 7/10
[52] U.S. Cl. .................................................. 474/112
[58] Field of Search ................... 474/112, 199, 95, 96, 474/902

[56] References Cited

U.S. PATENT DOCUMENTS 4,443,210 4/1984 Olschewski et al. ............ 474/112 x
4,457,740 7/1984 Olschewski et al. ........... 474/199 X
4,516,962 5/1985 Brandenstein et al. ............. 474/112

FOREIGN PATENT DOCUMENTS 2076108 11/1981 United Kingdom ................ 474/112

Primary Examiner—Stephen J. Novosad
Assistant Examiner—Thuy M. Bui
Attorney, Agent, or Firm—Rosen, Dainow & Jacobs

[57] ABSTRACT

A tension roller has a rolling bearing supported by a multipart support which is swivable about an eccentrically arranged mounting bolt. A rolling sleeve for a belt is arranged on the outer ring of the bearing. The support includes two side parts which abut the side surfaces of the bearing inner ring, thereby preventing axial movement. A central body is provided with respect to which the side parts are fixedly arranged. The central body is adapted to provide radial support for the bearing inner ring.

8 Claims, 5 Drawing Figures

TENSION ROLLER

FIELD OF THE INVENTION

The invention relates to a tension roller having a bearing which is axially secured between surfaces formed on two side elements of a support.

BACKGROUND OF THE INVENTION

A tension roller of the above-described type is shown in FIG. 2 of DE-GM 80 13 203. This tension roller has two side parts, each of which is cup-shaped and has an annular seat which extends only partly into the bearing bore. The seats extend to become radial contact surfaces which respectively abut the side surfaces of the inner ring of the bearing. The mounting of the bearing is achieved in part by radial force-fitting and in part by means of the contact surfaces which apply pressure as a result of tightening of the mounting bolt. In order that this embodiment can be used under high radial loading, the side parts must be made of relatively strong sheet metal, whereby the bearing can be force-fit only with great effort. In the case of extreme loads, the side parts must be nearly solid in construction, so that their density must be high.

SUMMARY OF THE INVENTION

The object of the invention is to provide a tension roller with a support adapted to withstand high radial loading and having low density.

This object is achieved in the present invention by connecting the side parts of the support to a central body which extends along the entire length of the bearing bore and has surfaces for radially supporting the bearing, in particular, axially extending surfaces circumferentially distributed at angular intervals.

According to this arrangement the bearing is diametrically supported by solid portions of the support which form seats for the bearing bore. For this reason, the tension roller (i.e. the support body) is able to withstand high radial stresses without distortion. It can nevertheless be produced with a light construction if the solid portions are relatively small, yet well distributed along the bore surface of the bearing.

BRIEF DESCRIPTION OF THE DRAWINGS

The preferred embodiments of the invention will be described in detail with reference to the following drawings, wherein.

DETAILED DESCRIPTION OF THE PREFERRED EMBODIMENTS

Figure 1:
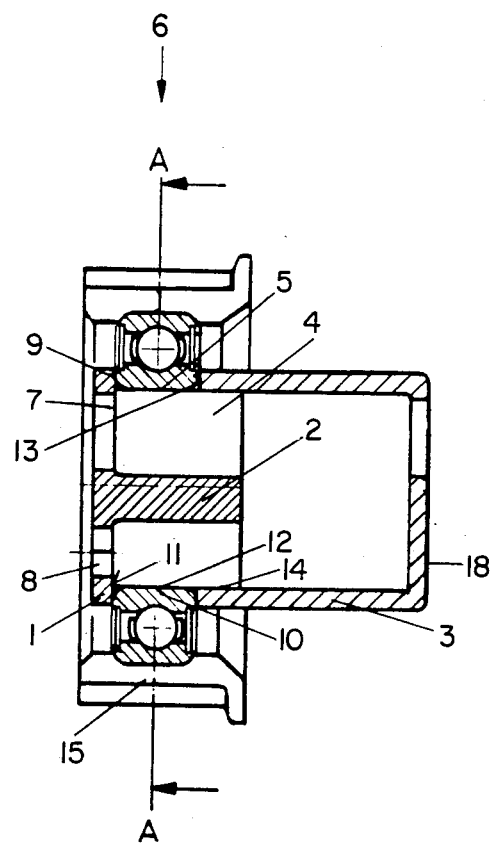
FIG. 1 is a longitudinal sectional view of a tension roller in accordance with the invention with a stellate central body.
Figure 2:
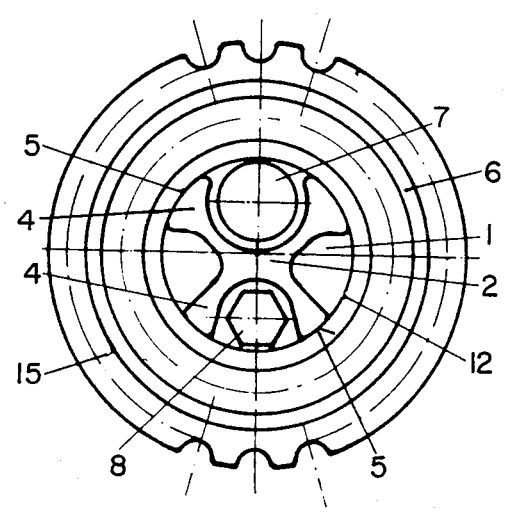
FIG. 2 is a cross-sectional view, taken along line A—A, of the tension roller of FIG. 1.

The tension roller depicted in FIGS. 1 and 2 has a support comprising a disk-shaped side part 1 which is integrally connected to a stellate central body 2 and a cup-shaped side part 3. The central body 2 with the disk-shaped side part 1 is, for example, manufactured by a sintering process and the cup-shaped part is made from sheet metal. The radially directed fins 4 of the stellate central body 2 are thickened in the circumferential direction at their ends and form thereby radially outwardly convex surface portions 5, which form seats for a ball bearing 6, while the portions of the central body 2 between the fins provide radial clearance with respect to the bore 12 of the ball bearing 6. The core of the central body is eccentrically arranged. This is clearly depicted in FIG. 2. In the side part 1, an eccentric bore 7 for receiving a mounting bolt (not shown) and a recess 8 of hexagonal profile for receiving an adjusting tool (not shown) are diametrically arranged between the radial fins 4, the bore and recess being axially directed. The side part 1 has a diameter which is greater than the diameter of the bore of the ball bearing 6 and forms thereby a contact surface which abuts the side surface 9 of the inner ring 10. The central body 2 passes through the bearing bore 12 and extends beyond the side surface 9 illustrated on the right of the inner ring 10. The convex surface portions 5 simultaneously serve as seating surfaces in the area of the cup-shaped side part 3. The front end 13 of the side part 3 abuts the confronting side surface 9 of the inner ring. An eccentric bore 7 formed in the base 18 of cup-shaped side part 3 corresponds to and is aligned with the eccentric bore 7 formed in the other side part 1. Adjacent the area of end 13, the bore of the cup-shaped side part 3 is provided with an axially milled inner surface 14 (not shown in detail), which can be easily mounted onto the convex surface portions 5 of the central body by force fitting. As a result, relative rotation of the side parts 1 and 3 is prevented. The ball bearing 6 is arranged on the convex surface portions 5 of the central body 2 with an easy sliding fit, whereby holding forces act on the bearing in the axial direction due to the mounting bolt extending through the side parts 1, 3 and the side surfaces 9 of inner ring 10 abutting the fixed side parts. As a result deformation does not occur. The rolling sleeve or pulley 15 is arranged directly on the outer ring of the bearing 6.

Figure 3:
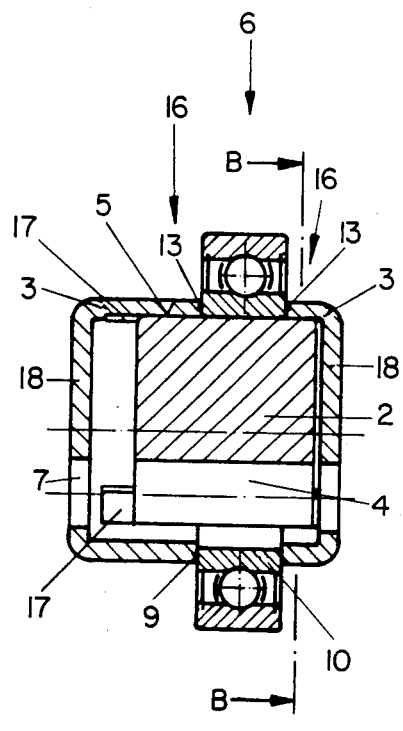
FIG. 3 is a longitudinal sectional view, taken along the line C—C of FIG. 4, of a tension roller with a central body connected to the side parts by form-locking.
Figure 4:
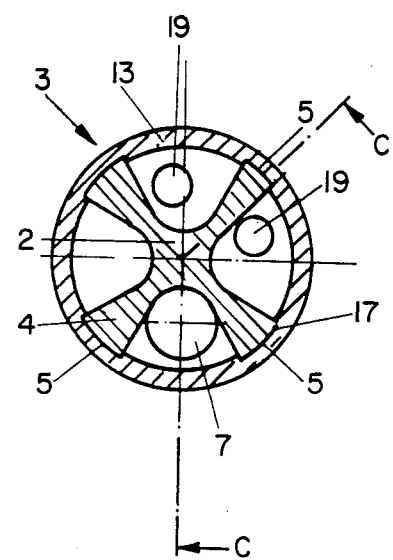
FIG. 4 is a cross-sectional view, taken along line B—B, of the tension roller of FIG. 3.

According to the embodiment of the tension roller depicted in FIGS. 3 and 4, a single stellate central body is provided, which has a substantially symmetrical profile with circumferentially thickened fins 4. The interstitial spaces receive a mounting bolt (not shown) and the inwardly projecting portion of an adjusting tool (not shown). The central body 2 is relatively longer than the illustrated ball bearing 6. The projecting portions 16 of the body 2 on both sides of the bearing serve as seating surfaces which are inserted in two opposite cup-shaped side parts 3. Axially directed grooves 17 are formed in the bore surface of each side part 3 as shown on the left in FIG. 3, which grooves correspond in arrangement and profile to the central body 2 so that the cup-shaped parts 3 may be slid on the body 3 and held by the grooves. In this way both side parts 3 are secured against relative rotation with respect to each other and with respect to central body 2. Eccentric bores 7 for receiving a mounting bolt (not shown) and corresponding bores 19 for the adjusting tool (not shown) are provided In the base 18 of the side parts 3. The axial clamping of the ball bearing 6 results, as in the previously described embodiment (see FIG. 1), from the abutment of the front edges 13 of the side parts 3 against the respective side surfaces 9 of the inner ring 10. The seating surfaces 5 at the ends of the fins 4 serve the functions of centering and radially supporting the ball bearing 6.

Figure 5:
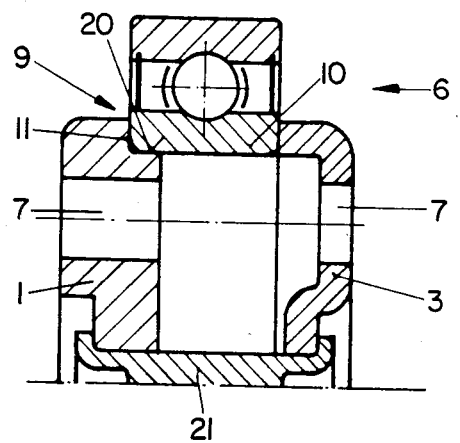
FIG. 5 is a partial longitudinal sectional view of a tension roller with side parts connected by a rivet.

In accordance with the embodiment of the tension roller illustrated in part in FIG. 5, the support comprises a cup-shaped sheet metal side part 3 and a relatively massive disk-shaped side part 1. The latter has a narrow annular seat 20 for the inner ring 10 of the ball bearing 6 and a contact surface 11, adjacent the seat 20, which abuts the side surface 9 of inner ring 10. Both side parts 1 and 3 are joined in the center of the support body by a rivet 21, by means of which the cup-shaped side part 3 is centered relative to the ball bearing 6 and the disk-shaped side part 1. The side parts 1 and 3 have corresponding eccentric bores 7 for receiving a mounting bolt (not shown).

The foregoing description of the preferred embodiment is presented for illustrative purposes only and is not intended to limit the scope of the invention as defined in the appended claims. Modifications may be readily effected by one having ordinary skill in the art without departing from the spirit and scope of the inventive concept herein disclosed.

What is claimed is:

1. In a tension roller, including a rolling bearing having an outer ring on which a rolling sleeve is arranged and an inner ring with a bore and with oppositely directed side surfaces, and including a multipart support body which is swivelable about an eccentrically arranged mounting bolt and which has first and second side parts with surfaces which respectively abut said side surfaces of said inner ring for preventing axial movement of said inner ring; the improvement comprising a central body which extends through said bore along its entire length and has seating surfaces circumferentially distributed at angular intervals for supporting said inner ring, said side parts being fixedly arranged with respect to said central body, said central body having a stellate cross section and comprising a plurality of substantially radial projections each having an end portion, said end portions forming said seating surfaces for said inner ring, whereby said mounting bolt can be arranged in the interstitial space between two of said radial projections of said central body.

2. The tension roller as defined in claim 1, wherein said central body comprises a core to which said radial projections are connected, said core being eccentrically arranged.

3. The tension roller as defined in claim 1, wherein said end portions are circumferentially wider than the thickness of said radial projections.

4. The tension roller as defined in claim 1, wherein said first side part is cup-shaped, said central body protrudes axially beyond one of said side surfaces of said inner ring, and said end portions of said radial projections form seats for at least said first side part.

5. The tension roller as defined in claim 1, wherein said central body is arranged with sliding fit in the bore of said inner ring.

6. The tension roller as defined in claim 4, wherein said first side part has a sleeve portion with recesses formed on the inner surface thereof, said recesses being adapted for form-locking with said corresponding end portions of said central body.

7. The tension roller as defined in claim 4, wherein said first side part has a bore surface with a milled edge and is joined to said central body by forcefitting.

8. The tension roller as defined in claim 1, wherein said second side part is disk-shaped, and said central body and said second side part are integrally formed.

* * * * *